United States Patent Office 3,281,836
Patented Oct. 25, 1966

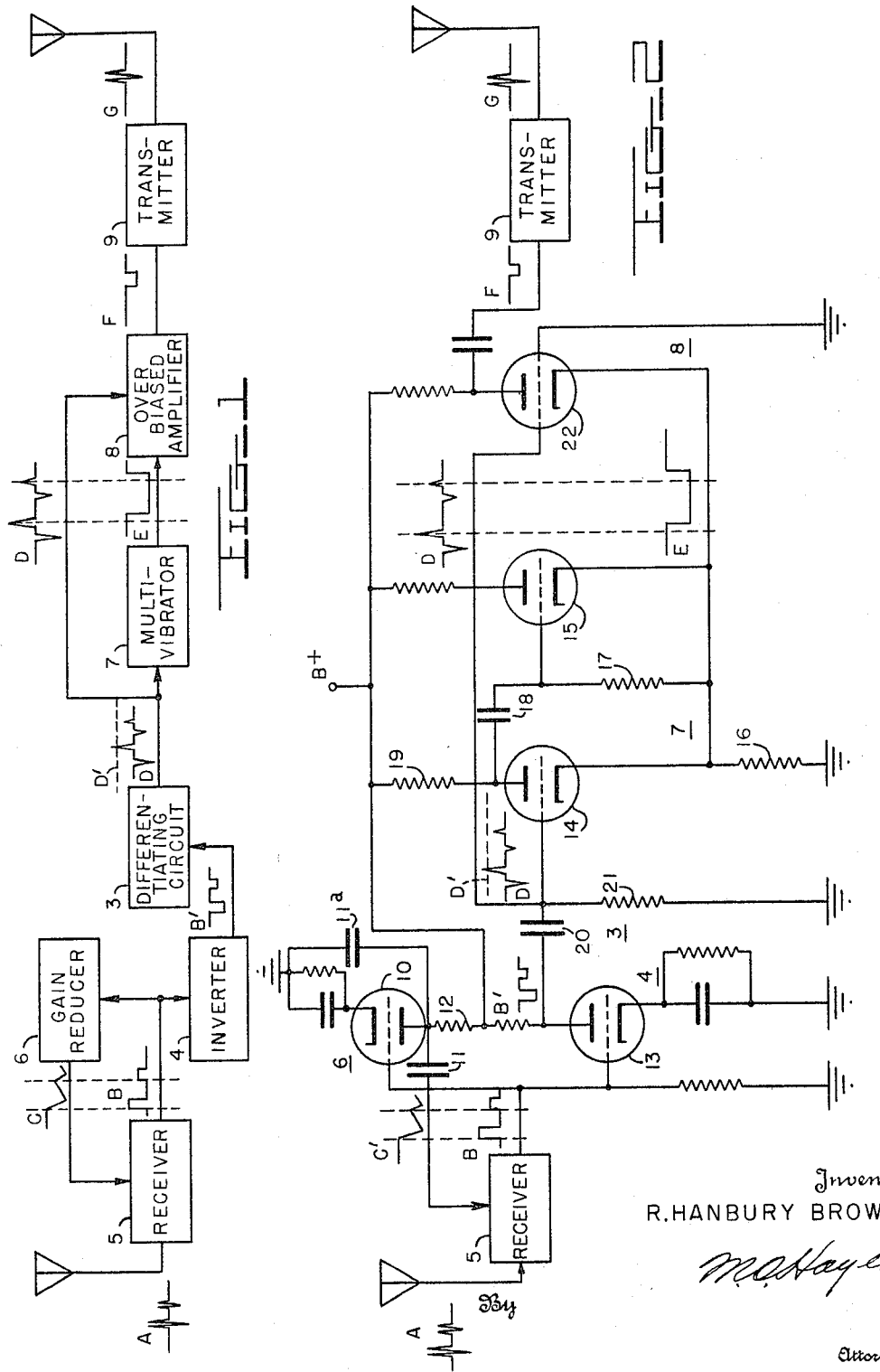

3,281,836
INTERROGATION GAIN CONTROL
Robert Hanbury Brown, London, England, assignor to the Minister of Supply in His Majesty's Government of the United Kingdom of Great Britain and Northern Ireland, London, England
Filed Aug. 26, 1948, Ser. No. 46,421
5 Claims. (Cl. 343—6.8)

This invention relates generally to interrogator-responder identification systems, and more particularly to the method and means of remotely controlling the responder receiver sensitivity from the interrogator transmitter.

In identification systems remotely operated by radiant energy pulses, it is generally desirable to determine, at least approximately, the direction from which the identification signals are received. For this purpose a directional interrogating antenna may be used. A directional antenna alone, however, is not completely adequate in that a nearby responder unit might be interrogated from side lobe radiation of such antenna. These responses should be eliminated in order to make directional identification accurate. Since the side lobe radiation is much weaker than the main lobe, it is only necessary for the responder to discriminate against the smaller signal.

If the transmitter power were reduced, both main lobe and side lobe radiation would be reduced and a level could be reached whereby nearby responders would be interrogated only by the main lobe radiation. However, it is not practical for the interrogator operator to use control of transmitter power to test for side lobe interrogations. Nor would it be useful to the operator to locate a receiver sensitivity control at the responder. It is necessary then, to provide a control at the interrogator operative to render the responder unresponsive to small signals. This control would be useful for excluding distant responses as well as side lobe responses.

It is therefore an object of this invention to provide an interrogator-responder system which may be controlled at the interrogator to discriminate against side lobe responses and distant responses.

It is another object of this invention to provide a remotely operated responder system whose sensitivity to a second pulse is determined by the time relation of the second pulse to a first pulse.

It is another object of this invention to provide a remotely operated responder system whose sensitivity is determined by the width of the received pulse.

It is still another object of this invention to provide a method of remotely controlling responses to radiant energy pulses by the length of a single pulse or by the time separation between a plurality of pulses in a pulse group.

Other objects and advantages of the invention will be apparent from the following description and accompanying drawing, in which:

FIG. 1 is a block diagram of a typical embodiment of this invention;

FIG. 2 is a schematic diagram illustrating in greater detail the embodiment of FIG. 1.

Briefly, this invention may be used with an interrogator-responder system to control the receiver sensitivity of the responder unit. Consider, for example, a double pulse system wherein the interrogator emits a pair of closely spaced pulses for each interrogation. The first pulse is used to produce a gain reduction which gradually returns to its normal level. The gain is reduced by a standard amount regardless of the amplitude of the first pulse. The second pulse is reduced in amplitude as compared to the first because of the reduction in gain, and the amount of reduction in amplitude depends upon the extent to which the gain level has returned to normal, and therefore depends upon the time separation between the first and the second pulses. The respondor unit is suitably adjusted so that if the second pulse does not have a certain minimum amplitude, the response signal will not be produced. The amplitude of the pulses entering the receiver varies according to the distance separating the interrogator and the respondor. Therefore, by controlling at the interrogator, the time separation of the first and second pulses, the distance at which the interrogator pulses will have sufficient amplitude to interrogate the respondor may also be controlled.

Consider now the drawing in detail. FIG. 1 is a block diagram of a typical embodiment of this invention showing by oscillograms the progress of a double pulse interrogation signal through a respondor. A double pulse signal of radiant energy shown by oscillogram A is received at receiver 5 of a respondor unit. The receiver is preferably of a type having an AVC circuit or a similar means of gain control. The detected signal output of the receiver 5, oscillogram B, is applied in parallel to an inverter stage 4 and to a gain reducer stage 6. The output of said gain reducer circuit is a sawtoothed voltage going initially sharply negative and thereafter rising exponentially toward its normal level. The sawtooth waveform is made negative by both first and second receiver output pulses of oscillogram B. This output of the gain reducer 6 is shown at oscillogram C and may be applied back to the AVC circuit of the receiver 5 to reduce the receiver gain in proportion to the negative amplitude of the sawtooth C. Because of this feed back action, the second pulse of the receiver output B appears attenuated at the input to the gain reducing stage 6.

The time relation of the receiver output and the gain reducer output oscillograms B and C respectively, is shown in FIG. 1. As will be seen from the oscillograms, the second pulse now has a reduced amplitude as compared to the first, and this reduction in amplitude will vary inversely with the spacing of the two pulses. If after the first pulse, the gain reduction voltage is allowed time to more nearly recover to its normal value before the arrival of the second pulse, the amount of gain reduction affecting the second pulse voltage will be less and the amplitude of the second pulse as shown at B will be more nearly that of the first.

The output of the inverter 4 is the two negative pulses shown in oscillogram B'. This output B' is fed to a differentiating circuit 3 to produce a sharply negative and a sharply positive pulse for each negative pulse of oscillogram B'. These differentiation output pulses are shown in oscillogram D and have an amplitude proportional to their respective producing pulses.

The output of the differentiating circuit 3, the four pulses of oscillogram D, is fed in parallel paths to an overbiased amplifier 8. One of said paths is direct and the other includes a multivibrator 7. The dotted horizontal line D' in oscillogram D indicates the firing potential for the multivibrator 7. It will be noted that only the first positive pulse has sufficient amplitude to fire the multivibrator.

The output of the multivibrator is a negative gating pulse as shown at oscillogram E. Said gating pulse is fed to the overbiased amplifier 8 along with the four pulses of oscillogram D. It will be further noted that the response time of the multivibrator is sufficient to delay the initiation of the gating pulse until after the termination of the first positive pulse of oscillogram D. Adding oscillogram D to oscillogram E provides sufficient potential to fire the overbiased amplifier at the point in time coincident with the second positive pulse.

The output of the overbiased amplifier 8 is a single pulse shown in oscillogram F which will trigger the transmitter 9 producing a single response pulse, shown by oscillogram G.

If the first and second pulses are separated by greater than a predetermined interval, the gating pulse from the multivibrator will have ceased before the second pulse reaches the overbiased amplifier and it will not fire. Also if the second pulse occurs too soon after the first its amplitude will be so reduced by the action of the gain reducer as to prevent triggering of the over biased amplifier.

FIG. 2 is a schematic diagram illustrating in detail the operation of some of the circuits shown in FIG. 1 by block. Oscillograms corresponding to those in FIG. 1 are shown in FIG. 2 to indicate the progress of a double pulse interrogation signal through the system. Again the interrogation signal is shown by oscillogram A at the input to the receiver 5 and the detected output is shown as oscillogram B. This output is applied to the control grids of a gain reducing tube 10, and an inverter tube 13. The gain reducing tube 10 may be a triode whose plate is coupled through a large time constant circuit back to the AVC circuit of the receiver 5. Said large time constant is provided in part by a large coupling condenser 11 and a large plate loading resistor 12 at the plate of tube 10. The conduction of tube 10 caused by the application of the first positive pulse from the receiver, oscillogram B, will discharge a suitable charging condenser 11a connected in shunt with the tube 10. At the termination of conduction in tube 10, condenser 11a will charge slowly through the plate load resistor 12. This cycle is repeated for the second pulse. Tube 10 is normally biased near saturation so that it will saturate upon the application of low intensity output signals from the receiver. Therefore, the condenser 11a will discharge to the same level for each pulse. This provides the voltage waveform shown in oscillogram E.

As described in connection with FIG. 1, the feed back of the gain reducing signal C from tube 10 to the receiver 5 produces a gain reduction in the receiver output B as seen at the input grid of the gain reducing tube 10. This receiver output B is inverted by tube 13. The inverter output, oscillogram B', is fed to a differentiating circuit 3 comprising a condenser 20 and a resistor 21. The differentiated output, oscillogram D, has a negative and a positive peak respectively for the leading and trailing edges of each pulse in oscillogram B'. The amplitude of these peaked pulses D is proportional to the pulses of B'.

As described in connection with FIG. 1, the output of the differentiating circuit 3 is applied through parallel paths to the overbiased amplifier 8, tube 22. The control grid of said tube 22 is fed directly by the differentiator output and the cathode is fed through a multivibrator 7. A dotted horizontal line D' is shown on oscillogram D to indicate the firing potential of the multivibrator input tube 14. Said tube 14 is normally biased below cut off by the quiescent plate current from the output tube 15 through their common cathode resistor 16. The high voltage at the plate of the nonconducting input tube 14 is coupled to the grid of the output tube 15 through a condenser 18 to maintain quiescent conduction in that tube. When the input tube 14 is rendered conducting by the first positive pulse of oscillogram D, plate current in that tube causes a voltage drop across the plate resistor 19. Said voltage drop is coupled to the grid of the output tube 15 through condenser 18 and cuts off that tube. The voltage will rise at the plate of said output tube 15 and remain at a higher level until the tube is again rendered conducting. The output tube 15 will remain nonconducting until the condenser 18 has charged to the tube's firing potential through the plate resistance 19 and the grid return 17. When tube 15 again conducts, its plate current through cathode resistance will cut off input tube 14 and return the multivibrator to its quiescent state. The drop in potential produced across cathode resistor 16 when tube 15 is not conducting produces a negative grid at the cathode. This is taken as the output of the multivibrator 7 and is shown at oscillogram E.

The multivibrator should be arranged to have sufficient response time to delay its output gating pulse until after the first positive pulse of oscillogram D.

The overbiased amplifier 8, tube 22, is normally biased below cut off by the quiescent current in cathode resistor 16. The gating pulse E and a second positive pulse of D having a predetermined amplitude together are required to fire this tube. If the second pulse had been attenuated sufficiently by the gain reducer circuit 6, tube 10, it would be insufficient when combined with the gating pulse to fire tube 22. By increasing the separation between the first and second pulse, a relation will be reached whereby the second pulse will arrive too late to combine with the gating pulse and tube 22 will not be fired. The gating pulse is prevented from combining with the first pulse to fire tube 22 by the response time of the multivibrator. This time relation is shown in both FIG. 1 and FIG. 2. The output of said tube 22 is a single negative pulse shown in oscillogram E which is applied to the transmitter of the responder as a keying signal.

It will be apparent that the circuit described above could be adjusted to operate from a single pulse whose width would determine the response control, or from multiple pulse groups greater than two in number. As illustrated by the oscillograms, production of a response signal from the transmitter 9 is dependent upon the amplitude of the received signals and their time relation, and hence is determined by the distance which the signal has been transmitted and by the pulse time relation as set up at the interrogator. Distance can therefore be simulated at the interrogator if it is desired at limit the system's operation to nearby responders. Similarly, response from side lobe radiations can be identified and eliminated by controlling the pulse spacing at the interrogator.

Although certain specific embodiments of this invention have been herein disclosed and described, it is to be understood that they are merely illustrative of this invention and modifications may, of course, be made without departing from the spirit and scope of the invention as defined in the appended claims.

What is claimed is:

1. In a radio signaling system for responding to pairs of incoming signal pulses, a pulse receiver having a voltage operated variable gain control, a sawtooth generator connected to the receiver to generate a sawtooth voltage in response to each received signal pulse, means connecting the output of said sawtooth generator to said receiver gain control to reduce the receiver gain in accordance with the amplitude of each sawtooth wave, a double pulse decoder connected to the receiver output and producing an output only in response to pulse pairs from said receiver exceeding a predetermined amplitude.

2. In a radio signaling system for responding to pulse pairs of incoming signals having variable time separation, a pulse receiver having a voltage operated variable gain control, a sawtooth generator connected to the receiver to generate a sawtooth voltage in response to each received signal pulse, each sawtooth voltage having a maximum duration exceeding the maximum pulse pair time separation, means connecting the output of said sawtooth generator to said receiver gain control to reduce the receiver gain in accordance with the amplitude of each sawtooth wave, a double pulse decoder connected to the receiver output and producing an output only in response to pulse pairs from said receiver exceeding a predetermined amplitude.

3. In a radio signaling system for responding to pulse pairs of incoming signals having variable time separation, a pulse receiver having a voltage operated variable gain control, a sawtooth generator connected to the receiver to generate a slowly rising sawtooth voltage in response to each received signal pulse, each sawtooth voltage wave having a maximum duration exceeding the maximum pulse pair time separation, means connecting the output of said sawtooth generator to said receiver gain control to reduce the receiver gain in accordance with the amplitude of each sawtooth wave, a double pulse decoder connected to the receiver output and producing an output only in response to pulse pairs from said receiver exceeding a predetermined amplitude.

4. In a radio signaling system for responding to pulse pairs of incoming signals having variable time separation, a pulse receiver having a voltage operated variable gain control, a sawtooth generator connected to the receiver to generate a slowly rising sawtooth voltage in response to each received signal pulse, each sawtooth voltage wave initiating from a fixed voltage reference and having a maximum duration exceeding the maximum pulse pair time separation, means connecting the output of said sawtooth generator to said receiver gain control to reduce the receiver gain in accordance with the amplitude of each sawtooth wave, a double pulse decoder connected to the receiver output and producing an output only in response to pulse pairs from said receiver exceeding a predetermined amplitude.

5. In a radio signaling system for responding to pulse pairs of incoming signals having variable time separation, a pulse receiver having a voltage operated variable gain control, a sawtooth generator connected to the receiver to generate a slowly rising sawtooth wave in response to each received signal pulse, each sawtooth voltage wave initiating from a fixed voltage reference and having a duration exceeding the maximum pulse pair separation, means connecting the output of said sawtooth generator to said receiver gain control to reduce the receiver gain in accordance with the amplitude of each sawtooth wave, a double pulse decoder connected to the receiver output and producing an output only in response to pulse pairs from said receiver exceeding a predetermined amplitude and having a time separation less than the maximum sawtooth voltage duration, the response period of said double pulse decoder being determined independent of the instantaneous amplitude of the sawtooth generator voltage.

References Cited by the Examiner
UNITED STATES PATENTS

| | | | |
|---|---|---|---|
| 2,250,708 | 7/1941 | Herz | 250—27.1 |
| 2,510,983 | 6/1950 | Krause | 250—27.1 |
| 2,517,579 | 8/1950 | Levy | 250—27.1 X |
| 2,521,710 | 9/1950 | Gallay | 250—27.1 X |
| 2,527,474 | 10/1950 | Alvarez | 250—27 X |
| 2,531,412 | 11/1950 | Deloraine | 343—6.5 |
| 2,594,916 | 4/1952 | Gulnac | 343—6.5 |

CHESTER L. JUSTUS, *Primary Examiner.*

WILLIAM G. WILES, NORMAN H. EVANS,
*Examiners.*

L. N. DAVIS, R. A. VAN KIRK, P. M. HINDERSTEIN, *Assistant Examiners.*